United States Patent
Lifshitz et al.

(10) Patent No.: US 7,724,764 B2
(45) Date of Patent: May 25, 2010

(54) ADAPTIVE SYNCHRONOUS MEDIA ACCESS PROTOCOL FOR SHARED MEDIA NETWORKS

(75) Inventors: Israel Lifshitz, Jerusalem (IL); Ron Sterenson, Raanana (IL); Aharona Lurie, Or-Yehuda (IL); Lior Picherski, Hod-Hasharon (IL)

(73) Assignee: CopperGate Communications Ltd., Tel Aviv (IL)

( * ) Notice: Subject to any disclaimer, the term of this patent is extended or adjusted under 35 U.S.C. 154(b) by 1528 days.

(21) Appl. No.: 10/127,693

(22) Filed: Apr. 23, 2002

(65) Prior Publication Data

US 2003/0198246 A1     Oct. 23, 2003

(51) Int. Cl.
*H04L 12/413* (2006.01)

(52) U.S. Cl. ............... 370/445; 370/276; 370/318; 370/337; 370/447; 370/451; 370/455; 370/458; 370/459; 370/461; 370/462

(58) Field of Classification Search ........... 370/445, 370/447, 451, 458, 459, 461, 462, 276, 318, 370/337, 455
See application file for complete search history.

(56) References Cited

U.S. PATENT DOCUMENTS

| | | | |
|---|---|---|---|
| 4,593,282 A * | 6/1986 | Acampora et al. | 370/447 |
| 4,773,066 A | 9/1988 | Kirkman | |
| 4,907,224 A | 3/1990 | Scoles et al. | |
| 5,384,777 A * | 1/1995 | Ahmadi et al. | 370/337 |
| 5,570,355 A * | 10/1996 | Dail et al. | 370/352 |
| 5,644,576 A * | 7/1997 | Bauchot et al. | 370/437 |
| 6,310,886 B1 | 10/2001 | Barton | |
| 6,467,003 B1 | 10/2002 | Doerenberg et al. | |
| 6,732,315 B2 * | 5/2004 | Yagil et al. | 714/755 |
| 6,747,996 B2 * | 6/2004 | Holloway et al. | 370/503 |
| 6,868,072 B1 * | 3/2005 | Lin et al. | 370/276 |
| 6,985,456 B2 * | 1/2006 | Gaskill et al. | 370/318 |
| 6,985,460 B2 * | 1/2006 | Sugaya et al. | 370/329 |
| 7,106,744 B2 * | 9/2006 | Gummalla et al. | 370/395.4 |
| 7,180,905 B2 | 2/2007 | Benveniste | |
| 2002/0019966 A1 | 2/2002 | Yagil et al. | |

FOREIGN PATENT DOCUMENTS

| | | |
|---|---|---|
| EP | 0622713 | 11/1994 |
| WO | WO 00 56928 | 9/2000 |

OTHER PUBLICATIONS

"Interface Specification for HomePNA 2.0.5.1 10MB Technology", Confidential Home Phoneline Networking Alliance, Oct. 1, 2001, version 2.0.5.1.
"Home Phoneline Networking Alliance Market Requirements Document for *HomePNA 3.0 Specification*", Home Phoneline Networking Alliance, Inc. Oct. 16, 2001.

* cited by examiner

*Primary Examiner*—William Trost, IV
*Assistant Examiner*—Toan D Nguyen
(74) *Attorney, Agent, or Firm*—Daniel J. Swirsky; AlphaPatent Associates Ltd.

(57) ABSTRACT

In some embodiments of the present invention, asynchronous network nodes and synchronous network nodes coexist on a shared media network.

5 Claims, 8 Drawing Sheets

US 7,724,764 B2

ADAPTIVE SYNCHRONOUS MEDIA ACCESS PROTOCOL FOR SHARED MEDIA NETWORKS

BACKGROUND OF THE INVENTION

The Home Phoneline Networking Association (HomePNA) is a consortium of communications companies that develop technologies for providing data communications over existing telephone wires inside a home or small office (SOHO).

The HomePNA Specification 2.0 (HPNA-2) is a standards document describing the second generation of such technology. It describes media access control (MAC) using an asynchronous priority-based protocol. The protocol uses carrier sense multiple access/collision detection (CSMA/CD) techniques to arbitrate access to the media together with a special signaling protocol used to resolve media collisions.

An HPNA-2 SOHO environment is unable to provide quality of service (QoS) guarantees at the level required by modem services such as, for example, telephony, video, audio, and future applications. It will be desirable that future generations of HPNA technology will be able to provide QoS guarantees at the level required by such modem services. Moreover, it will be desirable that some of these future generations will be interoperable with nodes operating based on HPNA-2.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
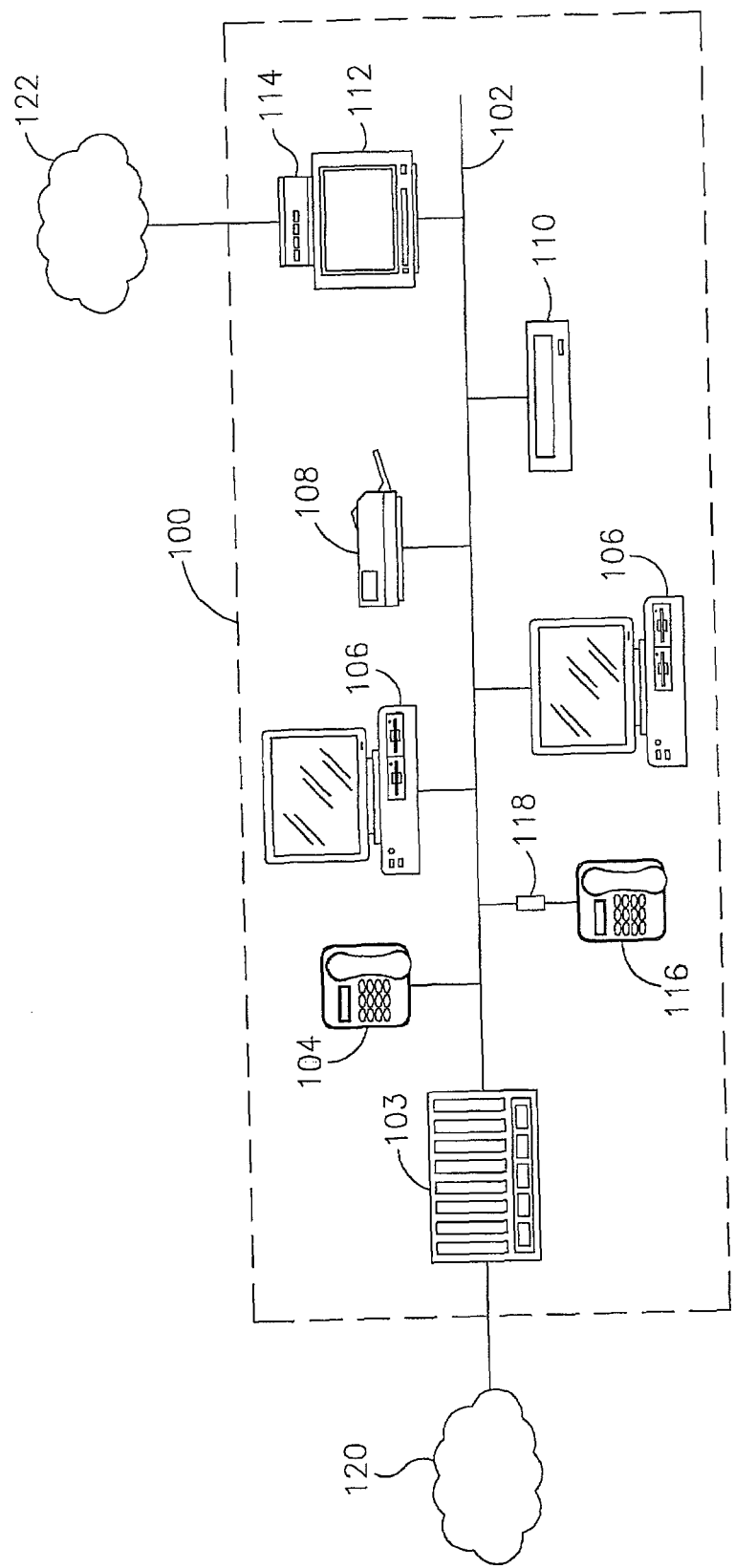
FIG. 1 is an illustration of an exemplary environment, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures and components have not been described in detail so as not to obscure the present invention.

Some embodiments of the present invention are directed to methods and systems relating to a shared media network environment. Although the scope of the present invention is not limited in this respect, the shared media network environment may be on a small physical scale, as may be found, for example, in a home, a small office, a multi-family dwelling, and the like. The shared media network may be, for example, a local area network (LAN) or a home network based on home phoneline network (HPNA) technologies. However, some methods and systems of the present invention may be used with any shared media network.

Reference is now made to FIG. 1, which is an illustration of an exemplary environment, generally referenced 100, according to some embodiments of the present invention. Environment 100 may comprise an existing plain old telephone service (POTS) telephone wire 102, which acts as LAN coupling various nodes. These nodes, which are home-phoneline-networking-enabled, may include, by way of example only, a gateway 103, a digital telephony device 104, computers 106, a printer 108, a digital versatile disk (DVD) player 110, a high definition television 112 and a set-top box 114. A POTS telephone 116 may be connected to LAN 102 via a homephoneline-networking adapter 118.

LAN 102 may be connected to an access network 120 via gateway 103. Non-limiting examples of access network 120 include a local access loop coupled to a central office (not shown), a cable connected to a cable central office (not shown), and a wireless access network (wireless Internet service provider) (not shown).

Although the scope of the present invention is not limited in this respect, environment 100 may include multiple gateways. For example, LAN 102 may be connected to another access network 122 via set-top box 114.

LAN 102 is a shared media network and access to it by the various nodes is controlled.

A node may comprise a device, for example a chip or chipset, that enables it to access shared media network 102 using a synchronous protocol, as will be explained in more detail hereinbelow. This protocol may be implemented in the device using software, firmware, hardware or a combination thereof. In this description and the appended claims, the term "synchronous node" is used to refer to such nodes. Although a synchronous node will access shared media network 102 using the synchronous protocol when possible, the device will also enable the node to use carrier sense multiple access/collision detection (CSMA/CD) techniques when appropriate.

Alternatively, a node may comprise a device, for example a chip or chipset, that enables it to access shared media network 102 using an asynchronous protocol. In this description and the appended claims, the term "asynchronous node" is used to refer to such nodes. Although the scope of the present invention is not limited in this respect, the asynchronous protocol may use CSMA/CD techniques to arbitrate access to shared media network 102. Moreover, the asynchronous protocol may be priority-based. Furthermore, the asynchronous protocol may be used together with a special signaling protocol used to resolve media collisions. An example of an asynchronous priority-based protocol using CSMA/CD techniques and having a special signaling protocol to resolve media collisions is that described in the HomePNA Specification 2.0 (HPNA-2).

In some embodiments of the present invention, environment 100 may comprise only synchronous nodes. In other embodiments of the present invention, environment 100 may comprise both synchronous nodes and asynchronous nodes.

The device of at least one of the synchronous nodes may have additional functionality to enable the synchronous node to act as a master in the environment, with the other synchronous nodes acting as slaves. The architecture may be such that a fixed synchronous node serves as the master, for example, gateway 103. Alternatively, the architecture may be such that the master is dynamically selectable from among the synchronous nodes whose devices have master functionality. In a further alternative, the architecture may be such that none of the synchronous nodes acts as a master in the environment—this alternative will be discussed later.

The master functionality may be implemented in the device using software, firmware, hardware or a combination thereof. Although the scope of the present invention is not limited in this respect, the master functionality may include the following:

Network Admission—managing the admission of synchronous nodes to the network by authenticating, registering, allocating resources and downloading network configuration;

Bandwidth Management—managing the allocation of media bandwidth resources to services in accordance with their quality of service (QoS) demands;

Scheduling—planning the media cycle and scheduling transmission so that QoS bandwidth, latency and jitter constraints are met;

Collision Resolution Method—specifying the collision resolution method to apply in a multicast transmission opportunity;

MAP Generation—generating a media access plan (MAP) that represents the results of the bandwidth management and scheduling process; and MAP Distribution—distributing tie generated MAP once per cycle to all nodes.

Figure 2:
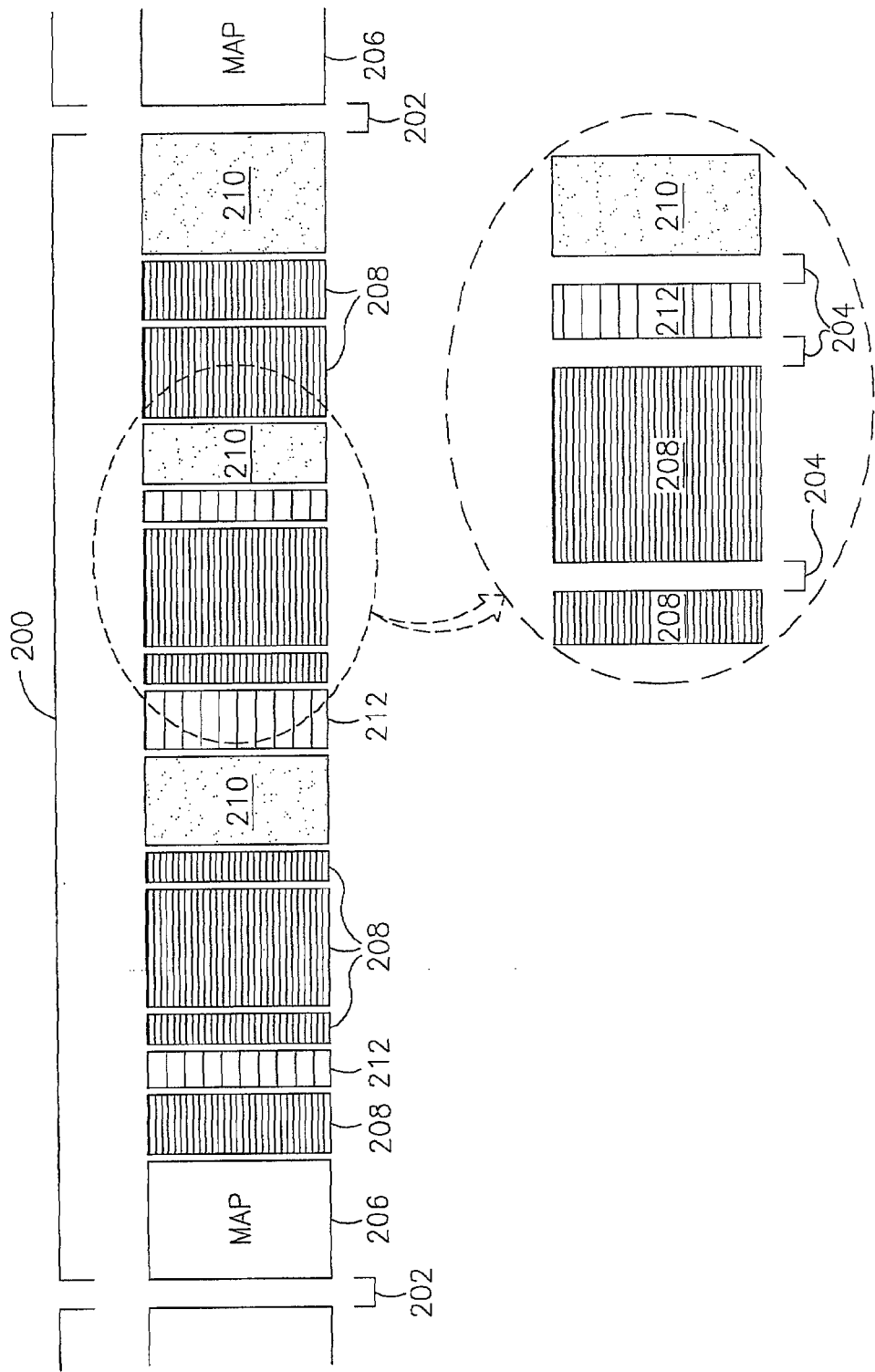
FIG. 2 is an illustration of an exemplary transmission over a shared medium using a synchronous media access protocol, according to some embodiments of the present invention.

Reference is now made to FIG. 2, which is an illustration of transmission over a shared medium, according to some embodiments of the present invention. Transmissions on the shared media are grouped into generally periodic cycles 200, separated by an inter-cycle gap 202. Transmission opportunities within a cycle are separated by an inter-burst gap 204.

A cycle 200 may begin with the broadcast of a MAP 206 by the master to all the nodes. The MAP transmission may mark the start of the cycle, so that a cycle may be defined as the time interval between two MAP transmissions. However, a MAP may specify its start time to be later than an end time of an immediately preceding MAP. The MAP divides the cycle into transmission opportunities (TXOPs) that are precisely timed (they are scheduled to begin at a predetermined start time relative to the start of the MAP and they are either of a predetermined duration or have a predetermined end time relative to the start of the MAP). The MAP may apply to the current cycle, the next cycle or even a future cycle. This may be achieved, for example, by including in the MAP a field that specifies the relative cycle offset from the current cycle during which this MAP applies.

Nodes may synchronize with the master by listening to the medium and waiting for a burst that is identified as a MAP transmission. As will be explained hereinbelow, the MAP contains timing information that allows the nodes to accurately time their access to the medium. Although the scope of the present invention is not limited in this respect, the MAP may include a timestamp that enables nodes to synchronize their internal clocks and/or their sampling rates to the master clock. The timestamp may be, for example, the time the master transmitted the previous MAP according to the master's clock.

Once synchronized, nodes may register with the master by sending a registration request transmission. In the registration request, the node requests entry to the network, and if authorized, the master supplies the node with a network address and network configuration data.

Once registered, nodes may request bandwidth for synchronous transmissions of user-data by sending a bandwidth request transmission or a request to set up a service stream. The request may specify where in the cycle the master ought to allocate TXOPs for this service stream. The master will allocate bandwidth, if available, to a particular synchronous node or to a particular user-data stream in accordance with the QoS requirements of existing services and the QoS requirements of the requested service. An implication of this is that certain management protocols that operate on a logical channel, such as, for example, rate negotiation and forward error correction, may be determined per service rather than per source node—destination node pair.

Bandwidth allocated to a particular data stream may be spread out over a number of transmission opportunities within the cycle. A synchronous node having more than one transmission opportunity within a single cycle allocated to it may, if it has the capability to do so, make its own scheduling decisions regarding how to distribute the transmission opportunities among its services.

The remaining part of cycle 200, that is, after MAP 206, comprises transmission opportunities. The MAP may specify the total length of the cycle and may specify each of the TXOPs in the cycle by specifying its length and to whom it is allocated. Different cycles may have different total lengths. For example, when new services are registered, the master may need to dynamically adjust the length of the cycle in order to meet QoS demands.

Some of the TXOPs (208), termed "unicast" TXOPs, may be allocated to a specific user-data stream or to a particular node. A unicast TXOP is contention-free, since synchronous nodes to whom the TXOP is not allocated will refrain from sending transmissions during the unicast TXOP and will confine their own transmissions within the limits of the TXOPs allocated to them. This is accomplished by having the synchronous nodes maintain a copy of the broadcast MAP for the current cycle. Therefore, collisions between synchronous nodes during unicast TXOPs ought not to occur in a homogeneous environment of synchronous nodes. A consequence of this is that in unicast TXOPs, synchronous nodes may transmit at a power that is sufficient to reach the destination node, but is not necessarily so high as to ensure that every node on the network can sense it.

A synchronous node may therefore male scheduled synchronous transmissions during a unicast TXOP which is allocated to it. A unicast TXOP is an example of a timed transmission opportunity, in that the master predetermines its start time and duration.

Some of the TXOPs (210), termed "multicast" TXOPs, may be allocated to a multicast group, in that they are available to nodes in the multicast group in a contention-based manner. For example, a TXOP may be available to synchronous nodes to send registration request transmissions only, or to send bandwidth request transmissions only, or to send management messages only. In another example, a TXOP may be reserved for the discovery of asynchronous nodes, or for transmissions by asynchronous nodes. In a further example, a TXOP may be available to all nodes (this is termed the "broadcast" group). In another example, a TXOP may be reserved for Voice over HPNA (VoHPNA) voice stream payload transmissions. In yet another example, a multicast TXOP may be used to handle variable bit rate (VBR) traffic from one or more synchronous nodes. The duration of the multicast TXOP may be set to satisfy the average bit rate (ABR) requirements for each of the members of the multicast group.

Synchronous nodes refrain from sending transmissions during multicast TXOPs that are allocated to multicast groups of which they are not members. Moreover, synchronous nodes belonging to the multicast group to which the TXOP has been allocated will confine their own transmissions within the limits of the TXOP. A multicast TXOP is another example of a timed transmission opportunity, in that the master predetermines its start time and duration.

The degree of contention of a multicast TXOP is controlled by restricting contention for the TXOP to members of the multicast group to which the TXOP has been allocated. The MAP may specify the collision resolution strategy to be used in the TXOP. For example, the strategy may be a simple backoff mechanism, whereby colliding nodes belonging to the multicast group wait a random number of the same type of multicast transmission opportunities before retrying. In another example, the TXOP is long enough in duration so that colliding nodes may have their collision resolved within the TXOP, using, for example, the collision resolution techniques of HPNA-2. Note that for all collision resolution strategies that operate within a multicast TXOP, the collision resolution process may proceed as long as the transmission will not exceed the end time of the TXOP.

Alternatively, the master may rank members of the multicast group to serialize their access to the network so that collisions are less likely to arise at the start of a multicast TXOP. Although the scope of the present invention is not limited in this respect, ranking may be accomplished, for example, using collision signaling sequence (CSS) protocol ranking or backoff level (BL) counter ranking, both part of HPNA-2.

It should be noted that synchronous nodes will likely use their CSMA/CD capabilities during multicast TXOPs allocated to multicast groups of which they are members.

Some of the TXOPs (212) may be unallocated, in which case they are effectively available to any node for transmission in a contention-based manner, as is the case for a multicast TXOP allocated to the "broadcast" group. An unallocated TXOP is another example of a timed transmission opportunity, in that the master predetermines its start time and end time. Transmissions initiated during an unallocated TXOP are unscheduled transmissions.

For the purposes of this specification and the claims, two MAPs may be termed "identical" if they describe unicast TXOPs allocated to the same nodes and/or multicast TXOPs allocated to the same groups and if the order, duration and relative timing of the unicast and/or TXOPs are the same in both MAPs. Although the scope of the present invention is not limited in this respect, if two consecutive MAPs are identical, then, instead of having the master transmit the later MAP, the master may transmit a "replacement" MAP indicating that it is identical to the earlier MAP. The "replacement" MAP will not necessarily include all of the information of the earlier MAP, and therefore may have a shorter length. The time that would have been used had a complete MAP been sent may therefore be used as an unallocated TXOP for unscheduled transmissions or as a TXOP for any special purpose assigned by the master.

Detection of a heterogeneous environment of synchronous nodes and asynchronous nodes can be performed by any synchronous node in the network. If the "detecting" node is not the master, the master is notified using a "signaling" bit in its subsequent transmissions. The master, upon detecting the signaling bit, will behave as if it had detected the heterogeneous environment itself.

Once a heterogeneous environment has been detected, the MAP may specify a mode so that certain parameters are different than in a homogeneous environment of synchronous nodes. These parameters may include, for example, the inter-cycle gap, the inter-burst gap, the minimum/maximum frame length, and an indication that frames of synchronous mode transmissions ought to be encapsulated within a header/trailer envelope that is compatible with asynchronous transmissions, such as, for example, HPNA-2 transmissions.

In some embodiments of the present invention, this mode may effectively be an inter-operability mode that enables HPNA-2 compatible asynchronous nodes to recognize transmissions from synchronous nodes as HPNA-2 transmissions. This may be accomplished by setting the parameters, such as, for example, the inter-cycle gap, the inter-burst gap and the minimum/maximum frame length, to the values specified by HPNA-2. Moreover, the frames of transmissions of synchronous nodes may be encapsulated within a header/trailer envelope that is compatible with asynchronous HPNA-2 transmissions but may ignored by the asynchronous nodes through the use of a Frame-Type value other than zero.

It will be appreciated that once the master has detected a heterogeneous environment, it may schedule at predetermined times opportunities for unbounded asynchronous transmissions from the asynchronous nodes using either unallocated TXOPs or multicast TXOPs allocated to transmissions from asynchronous nodes. These opportunities may be scheduled at a frequency and of a duration so as to enable services provided by these asynchronous transmissions to meet their inherent quality requirements. The quality requirements of the asynchronous transmissions are derived automatically by the master without explicit interaction from the asynchronous nodes.

In other embodiments of the present invention, as mentioned hereinabove, the architecture of the environment may be master-less, so that even if it is a homogeneous environment of synchronous nodes, the behavior is, in some respects, similar to that of an environment of asynchronous nodes, for example, an HPNA-2 environment. For example, the inter-cycle gap and inter-burst gap may be shorter than the values specified by HPNA-2. Similarly, the minimum/maximum frame length may be different than the values specified by HPNA-2. However, in a master-less environment, no MAP would be transmitted, no unicast or multicast transmission opportunities would be allocated, and access to the shared media would be based on carrier sense multiple access techniques.

As mentioned above, the environment may comprise both synchronous nodes and asynchronous nodes. Although the synchronous nodes will make transmissions only during dedicated transmission opportunities in accordance with the MAP or during unallocated TXOPs, the asynchronous nodes may initiate transmission any time they sense the medium to be idle. Unscheduled asynchronous nodes may interfere with the scheduled transmissions. The synchronous nodes may dynamically accommodate and compensate for this interference by following two rules that are described hereinbelow, effectively adjusting timing of some future scheduled synchronous transmissions by a minimal amount. This is illustrated in the following exemplary scenarios.

Reference is now made to FIGS. 3, 4, 5, 6, 7 and 8, which are illustrations of exemplary transmissions over a shared medium using a synchronous media access protocol and involving an interfering asynchronous transmission, according to some embodiments of the present invention. The upper row in each of FIGS. 3, 4, 5, 6, 7 and 8 shows a cycle comprising a MAP TXOP, followed by a unicast TXOP 1 allocated to a synchronous node whose ID is <<A>>, followed by an unallocated TXOP 2, followed by a unicast TXOP 3 allocated to a synchronous node whose ID is <<B>>, followed by a unicast TXOP 4 allocated to a synchronous node whose ID is <<C>>, followed by an unallocated TXOP 5. The next cycle begins with another MAP TXOP.

The MAP of this example may include the information given in the following table, where IBG denotes the time duration of an inter-burst gap:

| TXOP Index | Node/Stream ID | TXOP Type | Start Time | Length |
|---|---|---|---|---|
| 0 | MASTER ID | unicast | T0 = 0 | L0 |
| 1 | <<A>> | unicast | T1 = T0 + L0 + IBG | L1 |
| 2 | Broadcast ID | unallocated | T2 = T1 + L1 + IBG | L2 |
| 3 | <<B>> | unicast | T3 = T2 + L2 + IBG | L3 |
| 4 | <<C>> | unicast | T4 = T3 + L3 + IBG | L4 |
| 5 | Broadcast ID | unallocated | T5 = T4 + L4 + IBG | L5 |

The lower row in each of FIGS. 3, 4, 5, 6, 7 and 8 shows the actual transmissions that have occurred in the example. The behavior of the synchronous nodes is governed by two rules: 1) transmissions within a unicast or multicast TXOP will occupy the amount of bandwidth (length) allocated to the TXOP, irrespective of when the unicast or multicast TXOP actually starts; and 2) transmissions within an unallocated TXOP cannot extend beyond the scheduled end-time of the unallocated TXOP, regardless of the time at which the unallocated TXOP began. In other words, synchronous nodes will make synchronous transmissions that are time-limited, since they are either of a predetermined duration or have a fixed end time relative to the start of the MAP.

Figure 3:
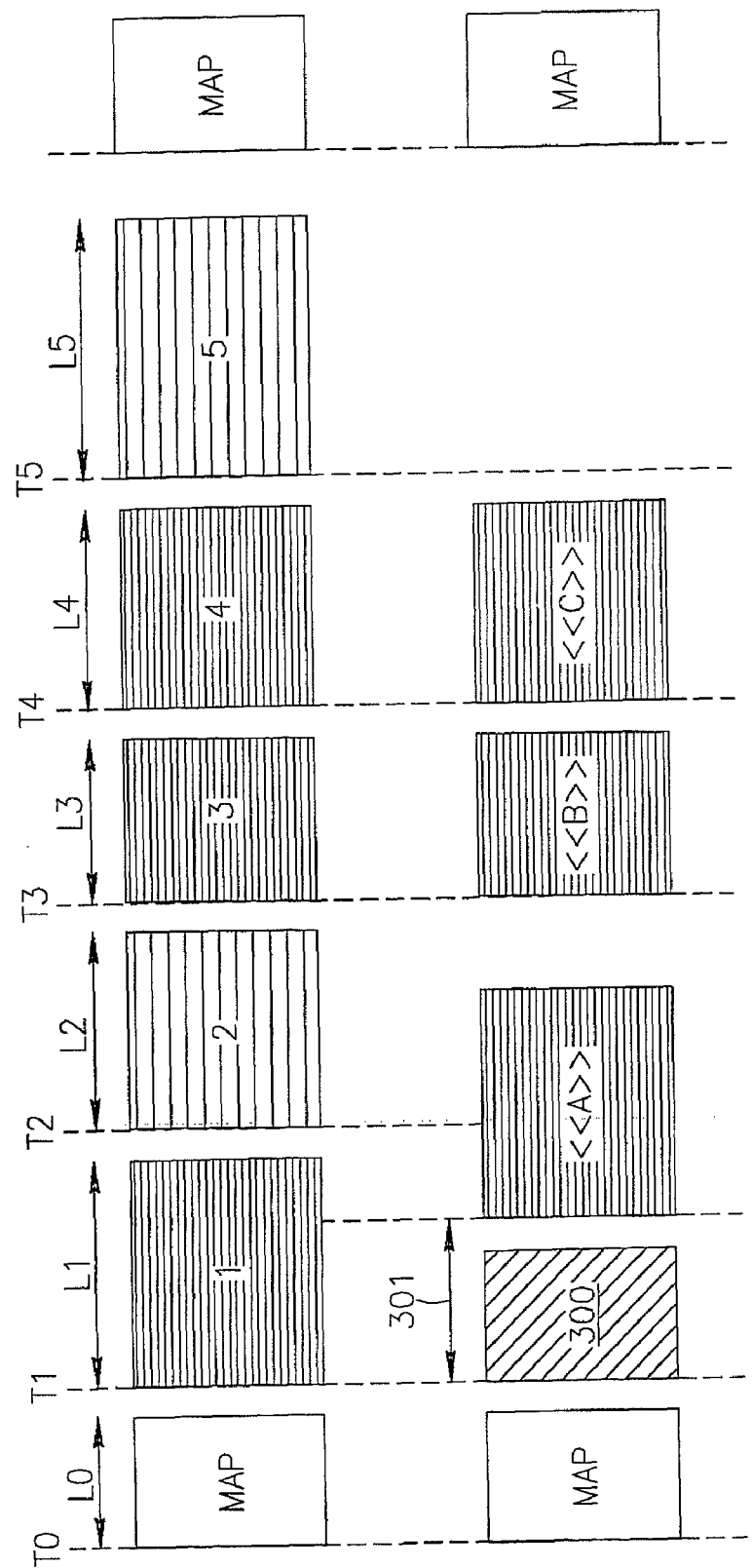
FIGS. 3, 4, 5, 6, 7 and 8 are illustrations of exemplary transmissions over a shared medium using a synchronous media access protocol and involving an interfering asynchronous transmission, according to some embodiments of the present invention.

In FIG. 3, the master transmits the MAP at T0, and then an asynchronous node takes control of the medium at T1 before synchronous node <<A>> begins transmitting. The asynchronous node transmits an unscheduled asynchronous transmission 300. Since the asynchronous node is unaware of the rules listed hereinabove, it will transmit as long as it wants to (i.e. the asynchronous transmission is unbounded). Since all the nodes on the medium support CSMA/CD techniques, the asynchronous transmission is uninterrupted. Using carrier sense techniques, synchronous node <<A>> waits until transmission 300 is finished, waits an additional inter-burst gap, and then begins transmission. This leads to jitter as indicated by arrow 301. Synchronous node <<A>> will transmit for the entire allocated time even though TXOP 1 starts late. Since, in this example, this transmission does not extend beyond the end time of unallocated TXOP 2, unicast TXOP 3 begins on time at T3 and the jitter is not propagated.

Figure 4:
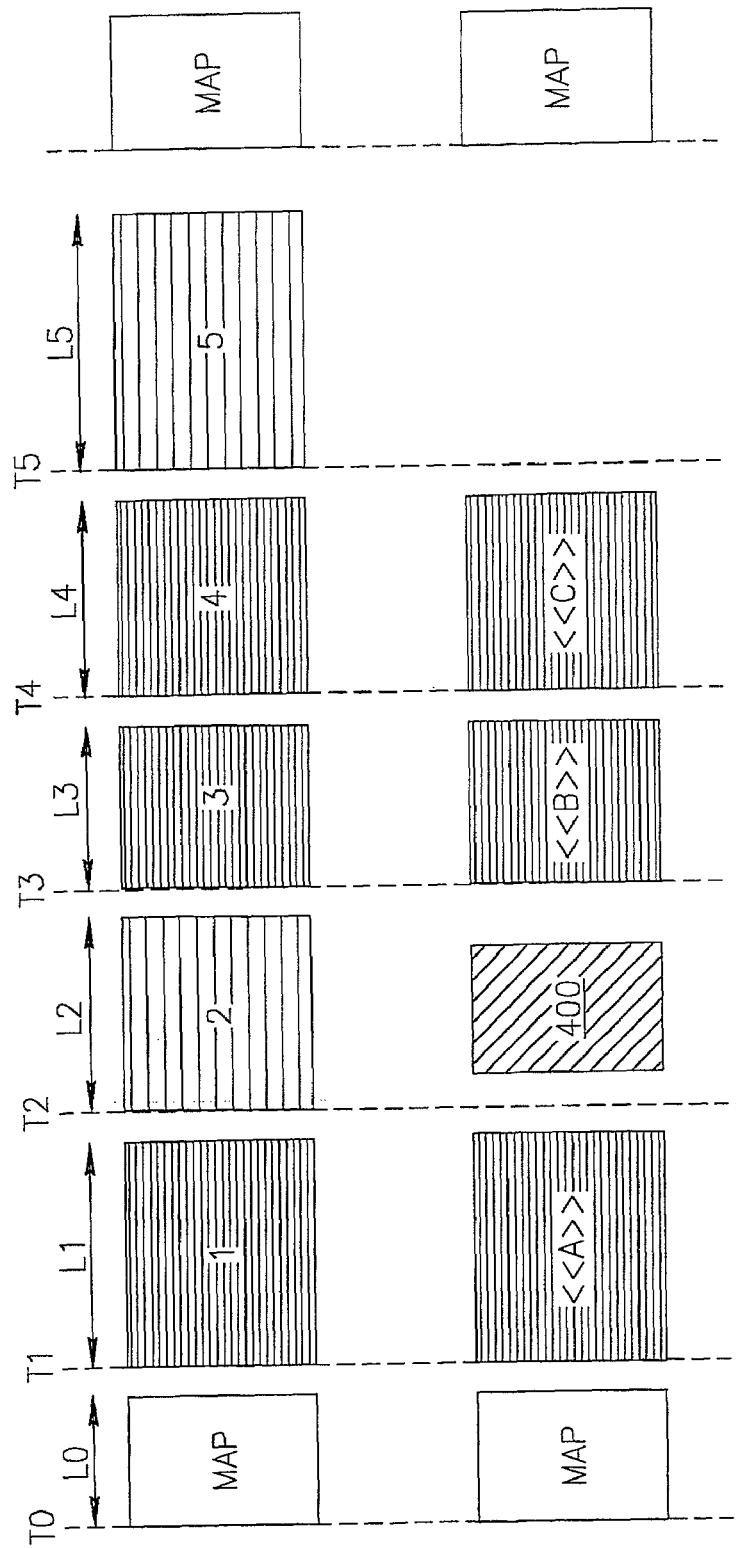

In FIG. 4, the master transmits the MAP as scheduled at T0, and then synchronous node <<A>> transmits during unicast TXOP 1 as scheduled at T1. During unallocated TXOP 2, the medium is idle and an asynchronous node takes control of the medium. The asynchronous node transmits an unscheduled asynchronous transmission 400 that, in this example, does not extend beyond the scheduled time for TXOP 2 (T2+L2). No jitter is introduced into subsequent transmissions, and therefore no accommodation needs to be made.

Figure 5:
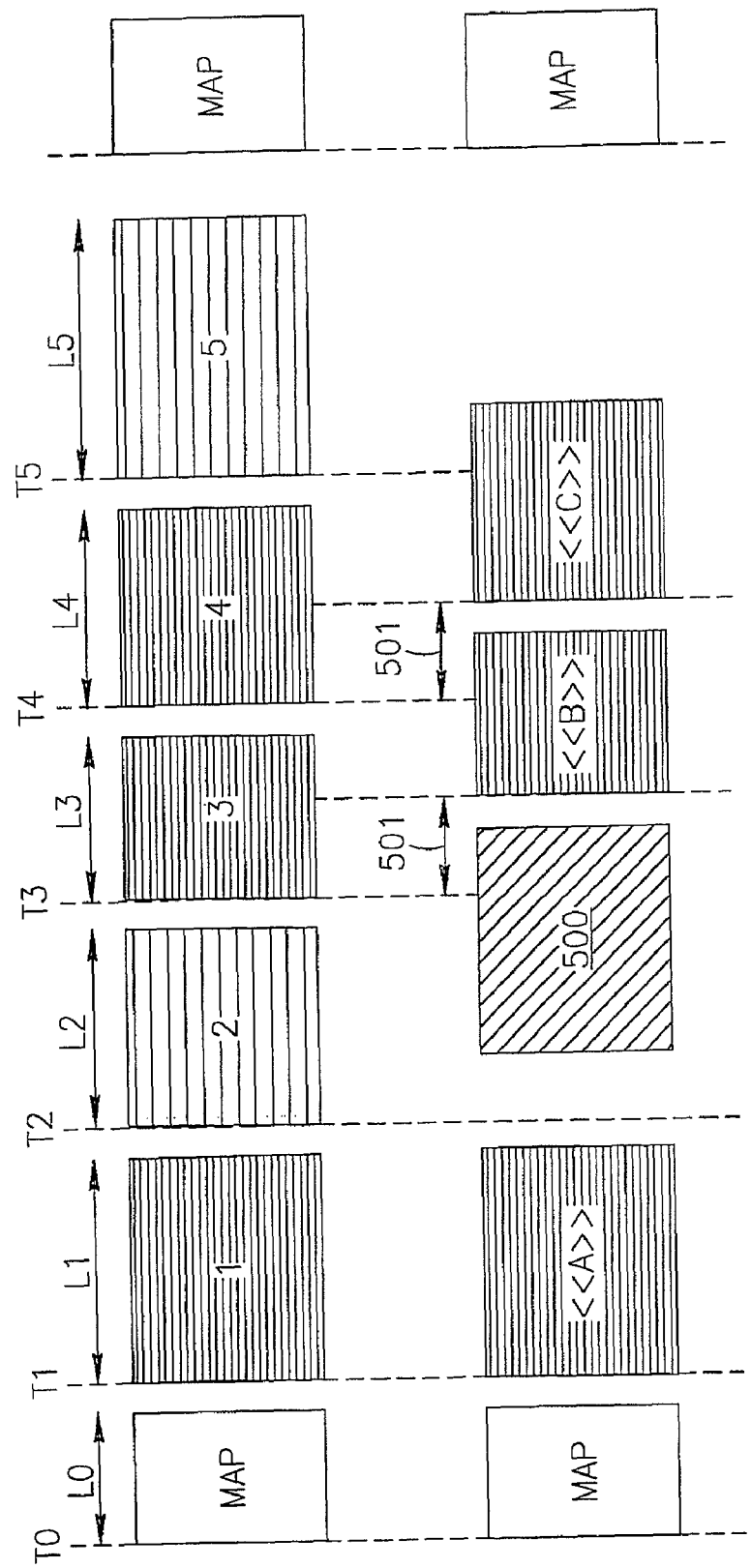

In FIG. 5, the master transmits the MAP as scheduled at T0, and then synchronous node <<A>> transmits during unicast TXOP 1 as scheduled at T1. During unallocated TXOP 2, the medium is idle and, using carrier sense techniques, an asynchronous node takes control of the medium. The asynchronous node transmits an unscheduled asynchronous transmission 500 that extends beyond the scheduled time of TXOP 2. Synchronous node <<B>> uses carrier sense techniques and delays its scheduled transmission (unicast TXOP 3) until transmission 500 is finished and an inter-burst gap has passed. Then synchronous node <<B>> begins its transmission, with a delay that leads to jitter as indicated by arrow 501. The transmission for unicast TXOP 4 is also delayed by the same amount, because synchronous node <<B>> will transmit for the entire allocated time of TXOP 3. Since, in this example, the transmission for unicast TXOP 4 does not extend beyond the end time of unallocated TXOP 5, transmission of the MAP of the next cycle begins on time and the jitter is not propagated.

Figure 6:
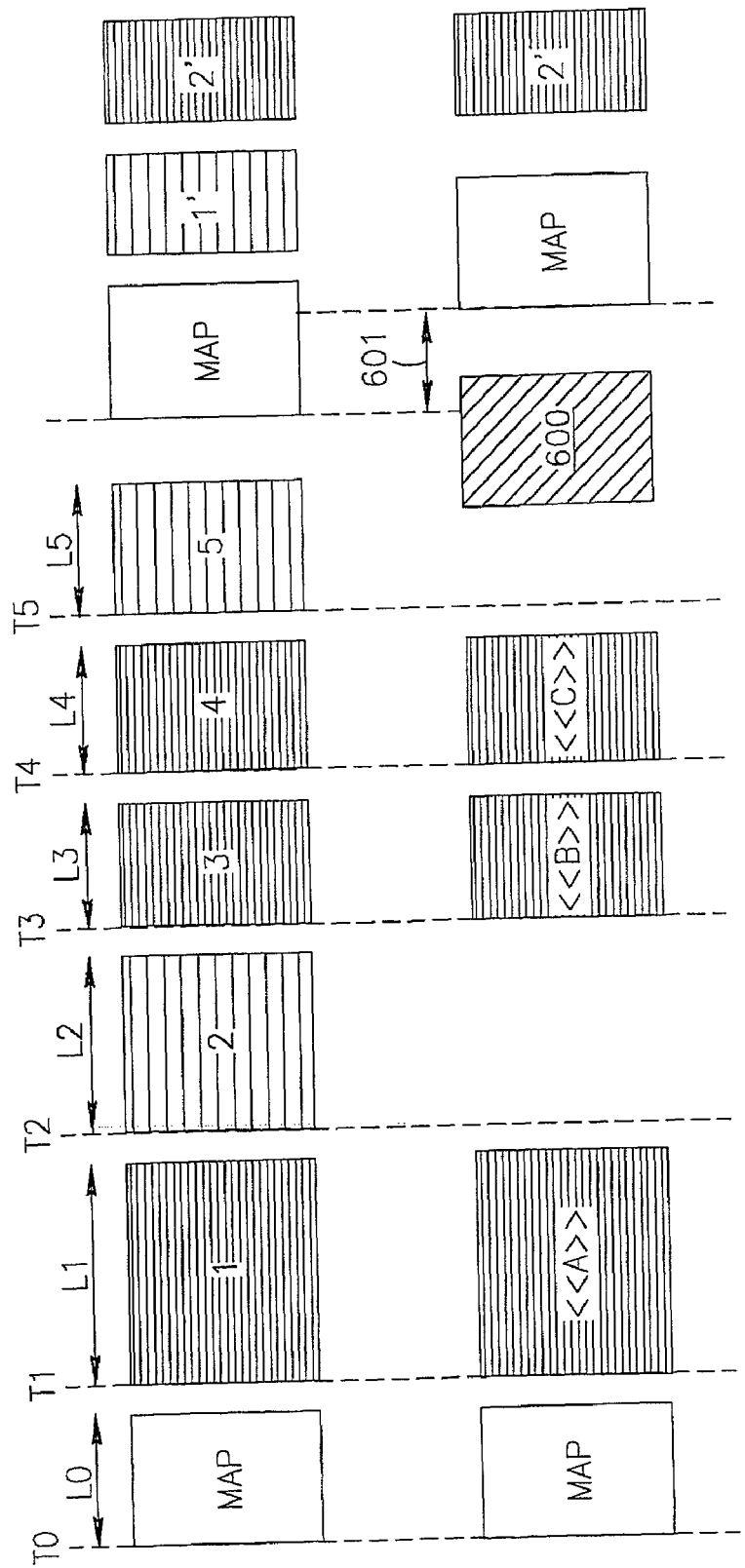

In FIG. 6, the master transmits the MAP as scheduled at T0, and then synchronous node <<A>> transmits during unicast TXOP 1 as scheduled at T1. Similarly, synchronous node <<B>> transmits during unicast TXOP 3 as scheduled at T3, and synchronous node <<C>> transmits during unicast TXOP 4 as scheduled at T4. During unallocated TXOP 5, the medium is idle and an asynchronous node takes control of the medium. The asynchronous node transmits an unscheduled asynchronous transmission 600 that extends beyond the scheduled time of TXOP 5 (T5+L5). The master uses carrier sense techniques and delays its scheduled MAP transmission until transmission 600 is finished and an inter-cycle gap has passed. Then it begins transmitting the next MAP, with a delay that leads to jitter as indicated by arrow 601. The next MAP will have this jitter recorded therein. The synchronous nodes may set their own clocks to T0+jitter when receiving a MAP with jitter recorded therein. This will enable the synchronous nodes to attempt to transmit on time, and not delayed by the jitter. For example, if the MAP is followed by an unallocated TXOP 1', and then a unicast TXOP 2', then if the duration of unallocated TXOP 1' is more than the jitter, the subsequent TXOPs of the cycle will start on time. This mechanism enables compensation for jitter in the transmission of a MAP.

Figure 7:
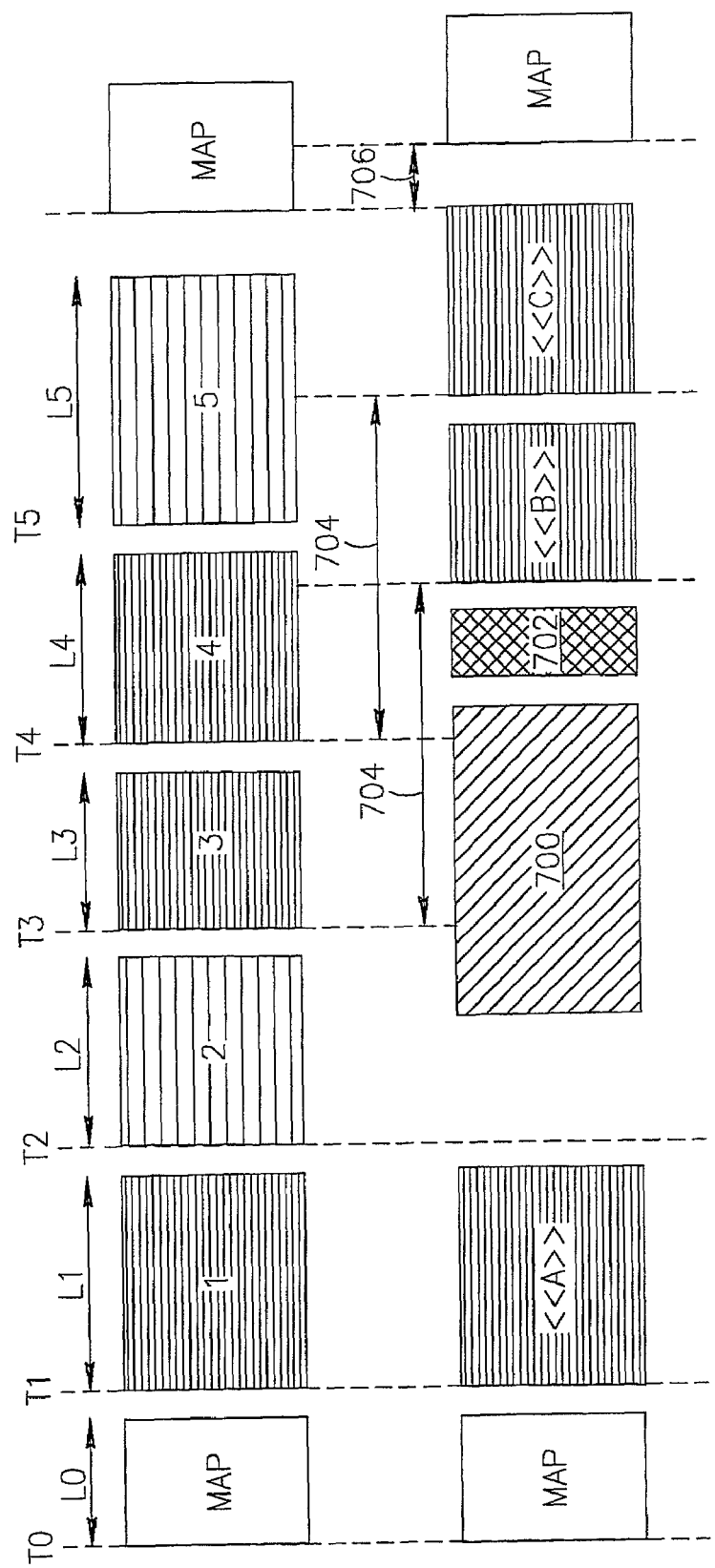

In FIG. 7, the master transmits the MAP as scheduled at T0, and then synchronous node <<A>> transmits during unicast TXOP 1 as scheduled at T1. During unallocated TXOP 2, the medium is idle and, using carrier sense techniques, an asynchronous node takes control of the medium. The asynchronous node transmits an unscheduled asynchronous transmission 700 that extends beyond the scheduled time of TXOP 2 and into the scheduled time of TXOP 3. Synchronous node <<B>> uses carrier sense techniques and delays its scheduled transmission until transmission 700 is finished and an inter-burst gap has passed. However, since the transmission time for TXOP 4 (T4) is also past, synchronous node <<C>> uses carrier sense techniques and delays its scheduled transmission until transmission 700 is finished and an inter-burst gap has passed. What results is a collision 702 between synchronous node <<B>> and synchronous node <<C>>.

Various collision resolution methods may be used to resolve the collision. For example, the synchronous node whose scheduled transmission time is earliest (in this example, it is synchronous node <<B>>) may be given priority, and will begin its transmission at a delay that leads to jitter as indicated by arrow 704. That synchronous node will transmit for the entire time allocated to it. The transmission for unicast TXOP 4 is also delayed by the same amount. The other synchronous node's transmission will occupy the entire time allocated to it, which, in this example, extends beyond the scheduled time of TXOP 5 (T5+L5). The master uses carrier sense techniques and delays its scheduled MAP transmission until the transmission is finished and an inter-cycle gap has passed. Then it begins transmitting the next MAP, with a delay that leads to jitter as indicated by arrow 706. The next MAP will have this jitter recorded therein.

This jitter may not be able to be completely absorbed using unallocated TXOPs. A backlog of traffic from synchronous network nodes may occur. Although the scope of the present invention is not limited in this respect, the master may ease this backlog by allocating more media time than is requested to a specific unicast or multicast TXOP. Alternatively, a node may use unallocated TXOPs to dissipate the accumulated traffic.

Figure 8:
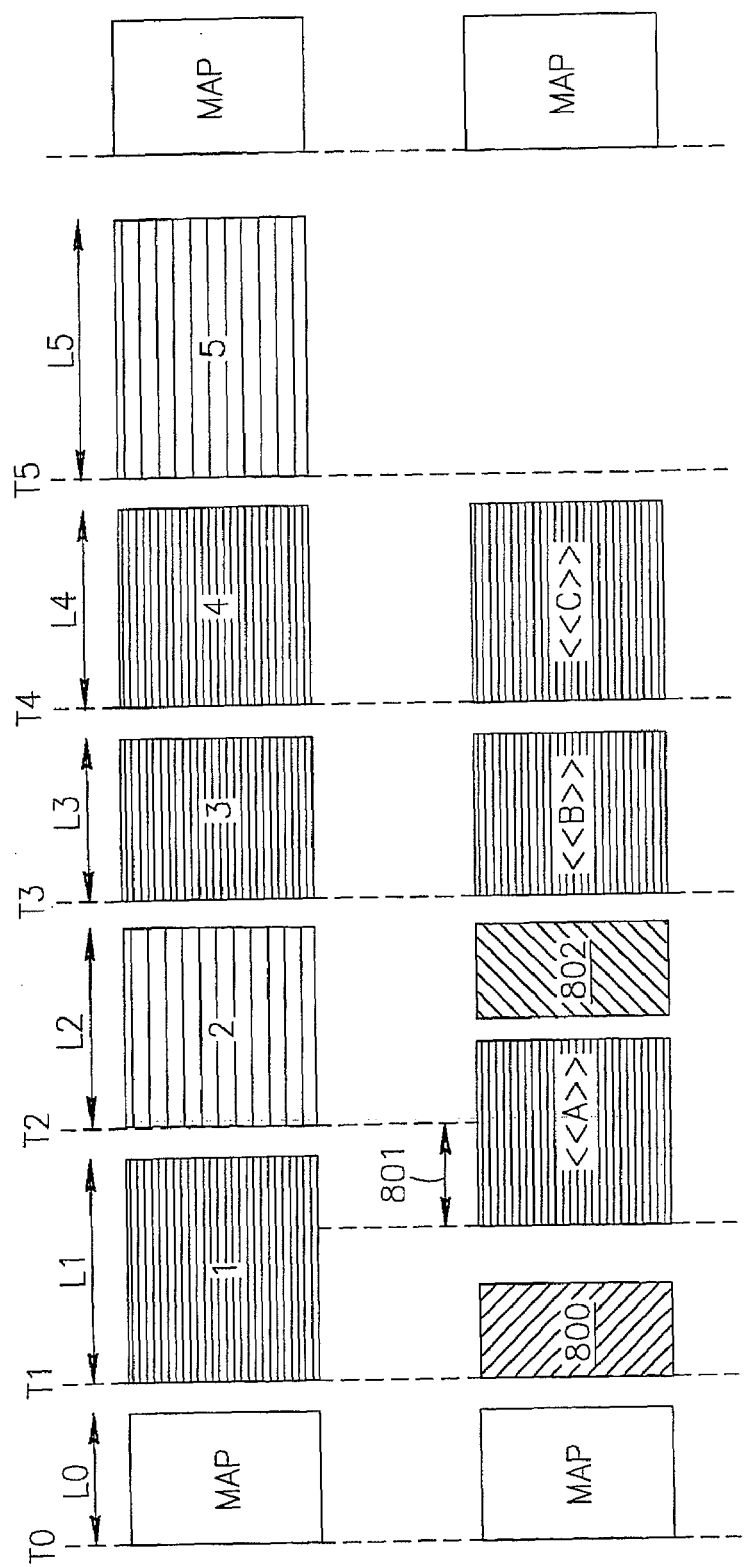

In FIG. 8, the master transmits the MAP as scheduled at T0, and then an asynchronous node takes control of the medium at T1 before synchronous node <<A>> begins transmitting. The asynchronous node transmits an unscheduled asynchronous transmission 800. Using carrier sense techniques, synchronous node <<A>> waits until transmission 800 is finished, waits an additional inter-burst gap, and then begins transmission. This leads to jitter as indicated by arrow 801. Synchronous node <<A>> will transmit for the entire allocated time even though TXOP 1 starts late. In this example, the transmission of TXOP 1 ends before the end time of unallocated TXOP 2.

Using carrier sense techniques, a synchronous node, for example, <<D>>, may take control of the medium before the end time of unallocated TXOP 2 and may begin transmitting an unscheduled transmission 802. Synchronous node <<D>> does not transmit beyond the end time of unallocated TXOP 2, and therefore, unicast TXOP 3 begins on time at T3 and the jitter is not propagated.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method implementable on a computing device, the method comprising:

generating plans of access to a medium to be shared by at least one synchronous node following said plans of access and at least one asynchronous node unaware of said plans of access, each of said plans describing a planned media access period having multiple transmission opportunities (TXOPs) therein, wherein at least one of said TXOPs is reserved for use by at least one synchronous node and more than one of said TXOPs are non reserved scheduled contention periods, said non reserved scheduled contention periods being of reducible length to compensate for unscheduled transmissions by one of said at least one asynchronous node during said at least one reserved TXOP, with at least one of said non reserved scheduled contention periods not located at an end of said media access period.

2. A method implementable on a computing device, the method comprising:

generating plans of access to a medium to be shared by at least one synchronous node following said plans of access and at least one asynchronous node unaware of said plans of access, each of said plans describing a planned media access period having multiple transmission opportunities (TXOPs) therein, wherein at least one of said TXOPs is reserved for use by at least one synchronous node and more than one of said TXOPs are non reserved scheduled contention periods, said non reserved scheduled contention periods being of reducible length to compensate for unscheduled transmissions by one of said at least one asynchronous node during said at least one reserved TXOP; and generating a plan in an environment of jitter, said plan having a non reserved scheduled contention period as a first transmission opportunity.

3. A method implementable on a computing device, the method comprising:

receiving on a synchronous node plans of access to a medium to be shared by at least said synchronous node following said plans of access and at least one asynchronous node unaware of said plans of access, each of said plans describing a planned media access period having multiple transmission opportunities (TXOPs) therein, wherein at least one of said TXOPs is reserved for use by at least one synchronous node and more than one of said TXOPs are non reserved scheduled contention periods;

detecting an unscheduled transmission during said reserved TXOP by one of said at least one asynchronous node; and reducing a planned length of a next non reserved scheduled contention period to compensate for said unscheduled transmission.

4. The method according to claim 3 and also comprising:

shifting start times for subsequent said reserved TXOPs in accordance with a transmission time for said unscheduled transmission, said subsequent reserved TXOPs being scheduled to start after said unscheduled transmission and before said next non reserved scheduled contention period.

5. A method implementable on a computing device, the method comprising:

receiving plans of access to a medium to be shared by at least one synchronous node following said plans of access and at least one asynchronous node unaware of said plans of access, each of said plans describing a planned media access period having multiple transmission opportunities (TXOPs) therein, wherein more than one of said TXOPs are scheduled contention periods; and at least reducing time allotted to a planned said scheduled contention period to compensate for unplanned transmissions by one of said at least one asynchronous node.

* * * * *